Sept. 6, 1932.   W. D. HAMER ET AL   1,875,376
MANIPULATING TOOL FOR HIGH TENSION TRANSMISSION LINES
Filed Feb. 14, 1927   2 Sheets-Sheet 2
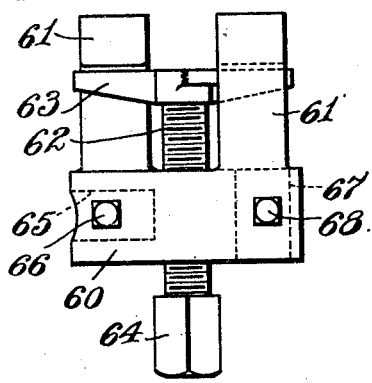
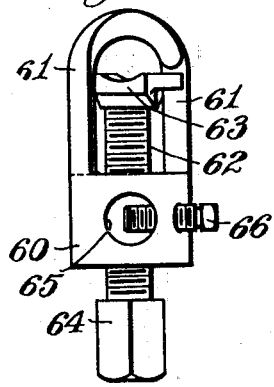
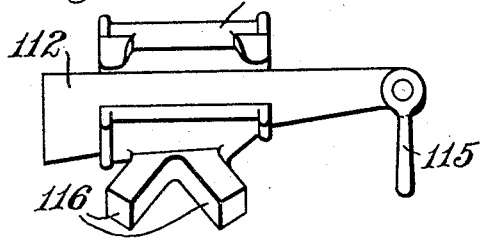
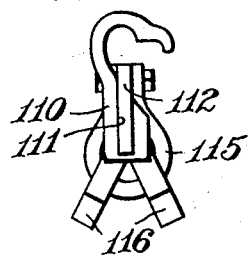
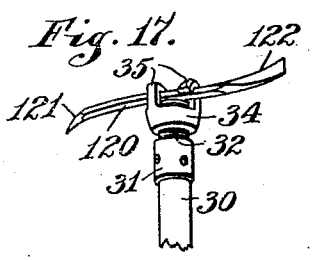
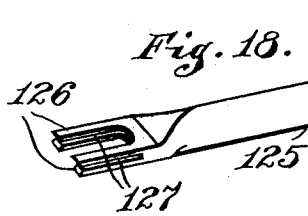
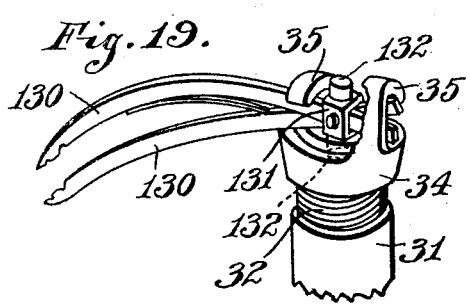
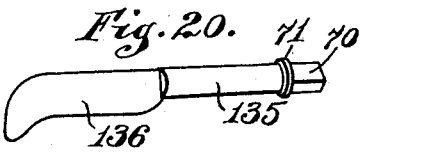
INVENTORS
William D. Hamer, Clarence E.
Chatfield and Brent Mills,
BY
Hood + Hahn.
ATTORNEYS Patented Sept. 6, 1932

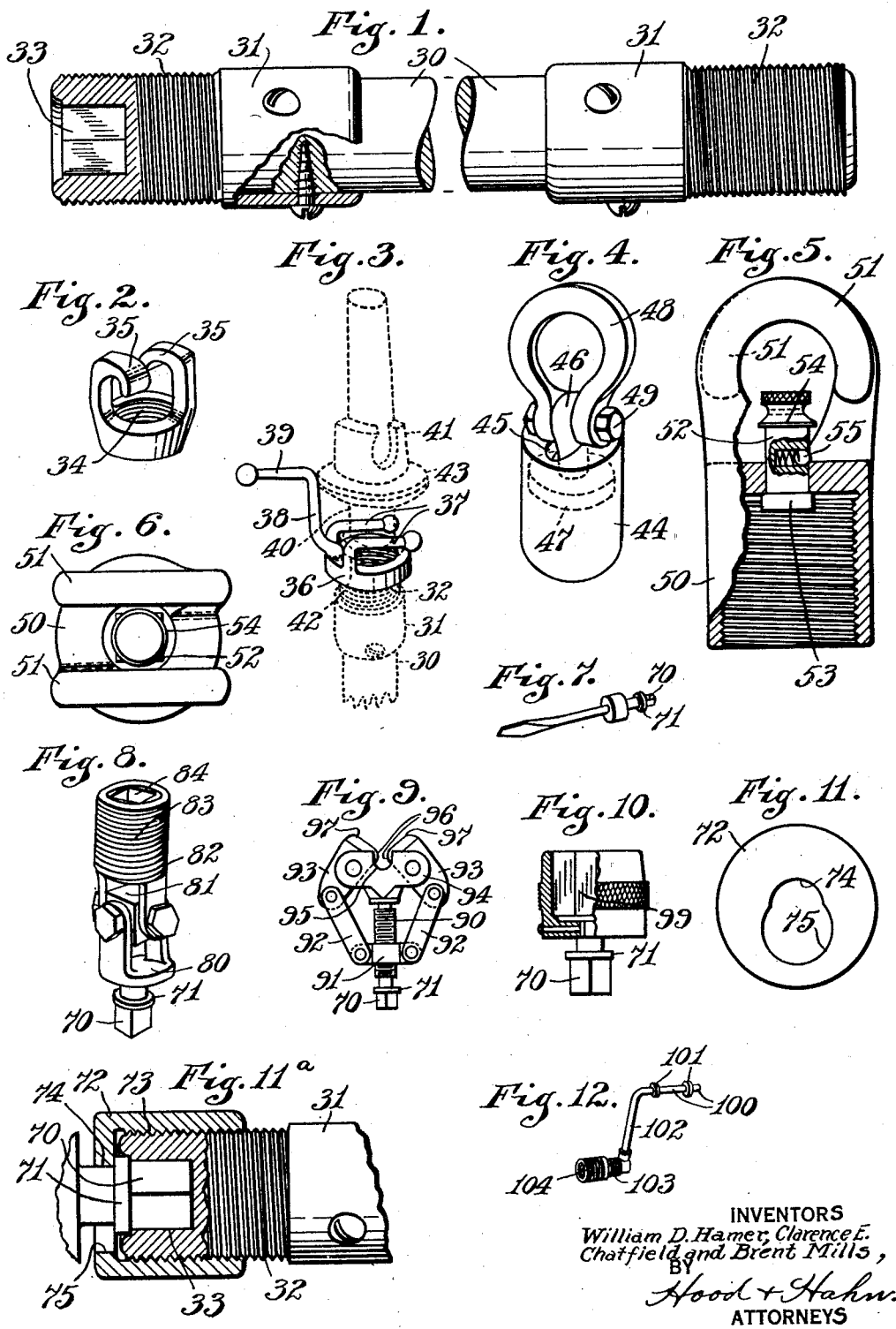

1,875,376

UNITED STATES PATENT OFFICE

WILLIAM D. HAMER AND CLARENCE E. CHATFIELD, OF INDIANAPOLIS, INDIANA, AND BRENT MILLS, OF CHICAGO, ILLINOIS, ASSIGNORS TO TRANSELECTRIC COMPANY, OF INDIANAPOLIS, INDIANA, A CORPORATION OF INDIANA

MANIPULATING TOOL FOR HIGH TENSION TRANSMISSION LINES

Application filed February 14, 1927. Serial No. 168,182.

The handling of live high tension circuit wires and associated parts is a dangerous occupation and the object of our invention has been to produce a set of instrumentalities by which such handling may be safely accomplished.

For this purpose our invention comprises a foundation member comprising a main handle stem of insulating material, such as wood, provided at one, or each, end with a fitting to which may be attached any one of a considerable number of specially designed tools or instrumentalities by means of which force applied to the handle may be transmitted to the line wires and other associated parts which may possibly be electrified. The various manipulating instrumentalities will, of course, vary widely in their details of construction in accordance with the purposes to be accomplished by their use but groups of such instrumentalities will possess, in common, certain structural features which make possible their association with the main manipulating member.

The accompanying drawings illustrate the aforesaid foundation member and a considerable number of special instrumentalities capable of being associated with said foundation member and typical of a large number of such special instrumentalities.

Fig. 1 is an axial section of the main handle member.

Fig. 2 a perspective of a gripping member.

Fig. 3 a perspective view of a member specially adapted for pin or plug setting and for operating fuse boxes and switches, the handle and a plug being shown in dotted lines, associated therewith.

Fig. 4 a perspective view of a swivel clevis.

Fig. 5 an elevation in partial axial section of a double hook member by means of which twisting forces as well as pulling and pusher forces may be applied.

Fig. 6 a plan of the instrumentality shown in Fig. 5.

Fig. 7 a perspective of a screw driver.

Fig. 8 a perspective of a universal joint coupling by means of which rotative forces applied to the handle may be carried around a corner and to which the various implements may be attached.

Fig. 9 a side elevation of a wire cutter.

Fig. 10 a side elevation and partial axial section of a socket wrench.

Fig. 11 a plan of a chuck cap by means of which instrumentalities of the broad type illustrated in Figs. 7 to 10 inclusive may be operatively associated with the handle.

Fig. 11a an axial section of the chuck cap connecting the handle and a tool.

Fig. 12 a perspective view of a ratchet socket wrench having a crank arm which may be coupled to the handle.

Fig. 13 a side elevation of a hook clamp by means of which temporary connections may be safely made with a live line wire.

Fig. 14 an end elevation of the clamp shown in Fig. 13.

Fig. 15 a side elevation of a tension clamp.

Fig. 16 an end elevation of the tension clamp shown in Fig. 15.

Fig. 17 a perspective of a cotter key puller mounted in an operative position on the handle.

Fig. 18 a perspective of a bolt and washer holder.

Fig. 19 a perspective view of pliers, especially designed for removing and placing cotter bolts and pins in place on the handle and ready for manpulation, and Fig. 20 a perspective of a knife.

In the drawings 30 indicates a wooden or other insulating handle or stem to one, or each, end of which is secured a metal fitting 31 having a socket for the reception of the end of stem 30, an externally threaded portion 32 and a polygonal (conveniently square) socket 33 in its exposed end said socket being preferably in the threaded portion 32.

This element 30—31—32—33 forms the base or foundation to which the various instrumentalities, of an almost endless variety may be attached.

These instrumentalities may be divided, roughly, into several types.

One of these types is illustrated by the instrumentalities shown in Figs. 2 to 6 inclusive wherein relative rotation between the handle member and the instrumentality is depended upon as a part of the necessary manipulation of the associated parts. In this type of instrumentality there is an internally threaded portion adapted to be threaded upon the threads 32 of the handle member and this internally threaded portion carries elements designed to be preliminarily associated with the conductor, pin, plug, fuse box, switch, etc., and then firmly associated with such element by a subsequent rotation of the handle member relative to the threaded portion of the instrumentality.

For instance, in Fig. 2 the internally threaded portion 34 is provided with two oppositely set axially extending laterally separated hooks 35—35 which may be first straddled over a conductor and then, by a rotation of 90 degrees, be hooked over the conductor, and then firmly associated with the conductor by screwing the threaded portion 32 of the handle up through the threaded portion 34 into engagement with the conductor and thus gripping such conductor between the hooks on one side and the threaded portion 32 of the handle on the other side.

In the construction shown in Fig. 3 the internally threaded collar 36 is provided with two laterally separated, transversely arranged fingers 37 which are axially spaced from the collar 36 and lie in a plane at right angles to the axis of said collar. Arranged between the fingers 37 is an axially extended finger 38 which extends axially to a point beyond the transverse plane of fingers 37 and at its end is outturned, in a direction opposite to the direction of the fingers 37, at 39, in a transverse plane more distant from collar 36 than the plane of fingers 37.

This instrumentality is used for placing primary plugs, in the manner indicated in dotted lines in Fig. 3. The neck 40 of the plug 41 is placed between fingers 37 and the cap flange 42 thereof is then firmly clamped between fingers 37 and the threaded portion 32 of the handle, the intermediate flange 43 of the plug engaging the axially extended portion of fingers 38. The outwardly projected portion 39 of finger 38 is useful in engaging switches and other movable elements and operating them.

In Fig. 4 the internally threaded cup 44 may be screwed upon portion 32 of the handle. The bottom of this cup is perforated at 45 to permit the projection therethrough of the clevis eye 46, said clevis eye being carried by a disk 47 (dotted lines Fig. 4) rotated within the cup. The perforated ends of the clevis ring 48 straddling eye 46 are pivotally connected thereto by the bolt 49. This device is useful when mounted upon the handle, as a strain insulator, and for many other purposes.

In Fig. 5 the internally threaded cup 50 is provided with two oppositely set laterally spaced hooks 51—51 which may be hooked over longitudinal elements, such as a conductor, cross bar, stay wire, etc., over which the two hooks may be straddled and then hooked by a turn of 90 degrees. Relative rotation between this instrumentality and handle, after the cup has been screwed on to the threaded portion 32, is obtained by an axially slidable lock pin 52 mounted in the bottom of the cup between the fingers 51. The polygonal enlargement 53 at the inner end of pin 52 limits outward movement and fits socket 33 of the handle and the flange 54 limits inward movement. The pin is frictionally held in either extreme of its positions by a spring ball 55 which may overlie the outer and inner faces of the bottom of the cup respectively.

In Figs. 13 and 14 the body 60 is provided with a pair of oppositely projected laterally separated parallel hook fingers 61—61. Threaded through body 60 between and parallel the hook fingers 61 is a clamping screw 62 which is rotatively associated with a clamping bar 63 which is slidably associated with and underlies the hooks of fingers 61. Screw 62 is provided with a polygonal head 64 which fits socket 33 of the head. Formed in body 60 at right angles to screw 62 is a conductor receiving socket 65 into which is laterally projected a clamping screw 66. Also formed in body 60 parallel with clamping screw 62 is another conductor receiving pocket or passage 67 into which is laterally projected a clamping screw 68. Conductors may have their ends secured in the pockets 65 and 67 and then be associated with a conductor clamped between hooks 61 and the clamping bar 63. In using this instrumentality the conductors will be first secured in pockets 65 and 67. Head 64 of bolt 62 will then be placed in socket 33 of the handle member and the instrumentality, with the parts connected thereto, raised to the conductor or other wire to which attachment is to be made, fingers 61 straddle said conductor and being then rotated through 90 degrees so as to bring the hooked portion of fingers 61 thereover. Thereupon further rotation of the handle member will cause rotation of the clamping screw 62 thus driving the clamping bar 63 into position to clamp the structure in place. After attachment of this implement to the wire the handle may be withdrawn and the implement left in place.

Implements of the character typified by Figs. 7 to 10 inclusive comprise a rotative element having a polygonal end 70 flanked by a circumferential collar 71.

Implements of this character are attached to the handle by means of a chuck cap shown in Figs. 11 and 11a. This chuck cap is a cup shaped member 72 internally threaded at 73 to receive the threaded portion 32 of the handle. The bottom of cup 72 is axially perforated by a perforation 74 having a diameter slightly greater than that portion of the rotation element of the implements immediately flanking collar 71 and less than the diameter of said collar. Perforation 74 is intersected by a larger perforation 75 which is eccentrically placed through the bottom of cap 72 and has a diameter sufficient to permit collar 71 of implements of the type under consideration to be projected therethrough.

When it is desired to use an implement of this type the end 70 and collar 71 thereof are projected through perforation 75 of a chuck cap and chuck cap laterally shifted into axiality with a rotative element of the implement whereupon the end 70 thereof may be inserted in socket 33 of the handle and the chuck cap screwed firmly to place on the threaded portion 32 thus holding the tool firmly in place and rotatively connecting its rotative element with the handle.

In Fig. 8 this rotative element has a universal joint yoke element 80 between the ears of which is pivoted a block 81 to which are pivoted the ears of the other joint element 82 which is threaded at 83 corresponding to the threaded portion 32 of the handle element and this portion is provided at its end with a socket 84 like socket 33. With such an implement all of the implements which may be attached to the handle may be adjusted to portion 82 of the universal joint and force applied to the handle thus transmitted to such implements at an angle.

In Fig. 9 the rotative element provided with end 70 and collar 71 is threaded at 90. Upon this threaded portion is a nut 91 to which are pivoted toggle links 92—92 which, in turn, are pivoted to cutter blades 93—93 which are pivoted to a cross head 94 rotatively associated with the inner end of the threaded stem 90. Cross head 94 is provided at its middle with a notch 95 adapted to receive a wire or other element which is to be cut. Cutter blades 93 are so formed at their initial cutting portion, as indicated at 96, as to first engage a wire in notch 95 at or slightly above the middle of such wire, and are so formed at their final cutting portions, as indicated at 97, to come together, without overlapping. This form of cutter blade gives a tendency to draw the wire which is being cut into the notch 95.

In the construction shown in Fig. 10 the rotative element has a polygonal cup or socket 99 adapted to receive a nut to be removed or placed.

In Fig. 12 a stem 100, of a size to be clamped between the handle and fingers 35 of the grip 33, is provided with spaced collars 101 to limit slippage when associated with the handle. Stem 100 has a crank arm 102 at right angles to stem 100 and this crank arm is connected, through the means of a common and well known reversible ratchet mechanism 103, with the socket element 104.

Tools of this type permit action on elements having a horizontal axis.

In the construction shown in Figs. 15 and 16 the tension clamp comprises a main body 110 slotted at 111 for the reception of sliding wedge 112, the arrangement being such that an element, like a conductor, may be clamped between the wedge and hook portions. A clevis 115 is attached to the small ends of the wedge so that a drawing force may be applied thereto.

Body 110 is provided with four diverging polygonal fingers 116 any one of which may be inserted in the socket 33 of the handle so that the implement may be readily shifted from place to place and associated with an element which is to be clamped thereby.

In an electrical installation of the character under consideration many cotter pins are used and these have to be extracted. This work may be accomplished by the implement shown in Fig. 17, said implement comprising a main stem 120, the ends 121 and 122 of which are bent and shaped to readily cooperate with the cotter pin. The stem 120 is preferably hexagonal in cross section so that desired angular position may be maintained by clamping the stem between portion 32 of the handle and the hooks 35 of the grip shown in Fig. 2.

Washers and bolts may be readily placed and removed by the implement shown in Fig. 18. Said implement comprises a main stem 125 which may be clamped between the portion 32 of the handle and the hooks 35 of the grip 34. Each end of stem 125 is bifurcated to form fork fingers 126 which may straddle a bolt beneath its head. These fingers 126 are conveniently slotted diametrically of the stem, as indicated in 127, the slot being of a width just a trifle greater than the thickness of washers ordinarily used so that a washer placed in the slots of the fingers may be readily put in place.

The implement shown in Fig. 19 is very handy for removing and replacing cotter pins and bolts, and for other purposes. This tool comprises a pair of plier levers 130, 130 which are pivoted in a pivot block 131 provided with trunnions 132 one of which may lie between the fingers 35 of the grip 34 and the other of which may enter socket 33 of the handle, the arrangement being such that, by placing the implement in the grip, as shown in Fig. 19, and screwing the handle into or out of the grip the fingers of the pliers may be closed or opened.

The implement shown in Fig. 20 is of the class of implements shown in Figs. 7 to 10 inclusive and 12, 17 and 18, comprising a polygonal end 70, a flanking collar 71, a stem 135 and a knife or chisel blade 136.

Stem 135 may be clamped between the handle-fitting 31 and fingers 35 of the grip.

We claim as our invention:

1. In an implement for manipulating high tension conductors, in combination, an insulating handle, a fitting for said handle having a socket in one end for the reception of the handle and a polygonal socket in its exposed end, said exposed end being externally threaded, and a gripping element for attachment to said fitting having an internally threaded socket for threaded engagement with said threaded end and carrying two laterally separated oppositely presented overlapping hook fingers.

2. In an implement for manipulating high tension conductors, in combination, an insulating handle, a fitting for said handle having a socket in one end for the reception of the handle and a polygonal socket in its exposed end, said exposed end being externally screw threaded and an implement for attachment to said fitting comprising an internally threaded cap for threaded engagement with the end of the fitting, having a pair of laterally separated oppositely presented overlapping hook fingers and a polygonal lock pin projectable through the bottom of the cap into the polygonal socket of the fitting.

3. In an implement for manipulating high tension conductors, in combination, an insulating handle, a fitting for said handle having a socket in one end for the reception of said handle and a polygonal socket in its exposed end, said exposed end being screw threaded and an implement for attachment to said fitting comprising an internally threaded cap for threaded engagement with said fitting having a pair of laterally separated oppositely presented overlapping hook fingers and a polygonal lock pin axially projectable through the bottom of said cap for seating in said polygonal socket and friction means for holding the pin in either projected or retracted position of adjustment.

WILLIAM D. HAMER.
CLARENCE E. CHATFIELD.
BRENT MILLS.